United States Patent [19]
Williamson et al.

[11] Patent Number: 5,457,077
[45] Date of Patent: Oct. 10, 1995

[54] MOVING BED REGENERATION PROCESS WITH COMBINED DRYING AND DISPERSION STEPS

[75] Inventors: Robert R. Williamson, Pleasant Valley, N.Y.; Michael E. Fettis, Prospect Heights; Paul R. Cottrell, Arlington Heights, both of Ill.

[73] Assignee: UOP, Des Plaines, Ill.

[21] Appl. No.: 176,159

[22] Filed: Dec. 30, 1993

[51] Int. Cl.$^6$ .................................................. B01J 38/44
[52] U.S. Cl. ............................. 502/37; 502/35; 502/38; 208/140
[58] Field of Search ................................ 502/37, 35, 38; 208/140

[56] References Cited

U.S. PATENT DOCUMENTS

| | | | |
|---|---|---|---|
| 2,908,636 | 10/1959 | Greenwood et al. | 208/140 |
| 2,965,563 | 12/1960 | Steffgen et al. | 208/140 |
| 3,134,732 | 5/1964 | Kearby | 208/140 |
| 3,647,680 | 3/1972 | Greenwood et al. | 208/65 |
| 3,652,231 | 3/1972 | Greenwood et al. | 23/288 G |
| 3,692,496 | 9/1972 | Greenwood et al. | 23/288 G |
| 3,986,982 | 10/1976 | Crowson et al. | 252/415 |
| 4,687,637 | 8/1987 | Greenwood | 422/62 |
| 4,701,429 | 10/1987 | Greenwood | 502/37 |
| 5,087,792 | 2/1992 | Cottrell et al. | 585/661 |
| 5,151,392 | 9/1992 | Fettis et al. | 502/37 |
| 5,227,566 | 7/1993 | Cottrell et al. | 502/35 |

*Primary Examiner*—Anthony Mc Farlane
*Attorney, Agent, or Firm*—Thomas K. McBride; John G. Tolomei

[57] ABSTRACT

A regeneration process for reconditioning catalyst particles containing platinum by transferring the catalyst particles through a combustion zone and a reconditioning zone is disclosed. Drying of the catalyst particles and redispersion of the platinum occur simultaneously in a single reconditioning zone. Catalyst that enters the reconditioning zone is contacted countercurrently with a heated gas stream containing chlorine and oxygen. A low moisture content of the gas stream aids drying and allows the equilibrium reaction between hydrogen chloride and oxygen on the one hand, and water and chlorine on the other hand to be shifted to chlorine. This shift of the equilibrium reaction can be further improved by maintaining an oxygen-enriched environment within the reconditioning zone. By eliminating the need for separate drying and redispersion zones used previously, the regeneration apparatus is less expensive to build and the regeneration process is less expensive to operate.

20 Claims, 2 Drawing Sheets

MOVING BED REGENERATION PROCESS WITH COMBINED DRYING AND DISPERSION STEPS

FIELD OF THE INVENTION

This invention relates to the art of catalytic conversion of hydrocarbons to useful hydrocarbon products. More specifically, it relates to the reconditioning of spent hydrocarbon conversion catalyst so that the catalyst can be reused in a hydrocarbon conversion reaction.

BACKGROUND OF THE INVENTION

Catalytic processes for the conversion of hydrocarbons are well known and extensively used. Invariably the catalysts used in these processes become deactivated for one or more reasons. Where the accumulation of coke deposits causes the deactivation, reconditioning of the catalyst to remove coke deposits restores the activity of the catalyst. Coke is normally removed from catalyst by contact of the coke containing catalyst at high temperature with an oxygen-containing gas to combust and remove the coke in a regeneration process. These processes can be carried out in-situ or the catalyst may be removed from a vessel in which the hydrocarbon conversion takes place and transported to a separate regeneration zone for coke removal. Arrangements for continuously or semi-continuously removing catalyst particles from a reaction zone and for coke removal in a regeneration zone are well known.

In order to combust coke in a typical regeneration zone, a recycle gas is continuously circulated to the combustion section and a flue gas containing by-products of a coke combustion, oxygen, and water is continually withdrawn. Coke combustion is controlled by recycling a low oxygen concentration gas into contact with the coke-containing catalyst particles. The flue gas/recycle gas is continuously circulated through the catalyst particles. A small stream of makeup gas is added to the recycle gas to replace oxygen consumed in the combustion of coke and a small amount of flue gas is vented off to allow for the addition of the makeup gas. The steady addition of makeup gas and the venting of flue gas establishes a steady state condition that produces a nearly constant concentration of water and oxygen as well as the combustion products in the recycle gas.

In continuous or semi-continuous regeneration processes, coke laden particles are at least periodically added and withdrawn from a bed of catalyst in which the coke is combusted. Regions of intense burning that extend through portions of the catalyst bed develop as the coke is combusted. After this intense burning the catalyst requires reconditioning to restore the noble metal, usually platinum, to its most highly catalytic state and to replace chloride on the catalyst that may be lost in the reaction zone or through the regeneration process. Reconditioning for a reforming catalyst will include contact with a chloride containing compound, to redisperse the platinum metal and replace the chloride that may be lost from the catalyst, followed by a drying step to reduce the moisture content of the catalyst and finally a reducing step to change the platinum metal from various oxidized states to a reduced metallic condition. Alternatively, the reconditioning will involve reversing the order of the redispersion and drying steps, so that the regeneration process and arrangement begins with a combustion zone which is followed by a drying zone to remove moisture from the catalyst particles before they enter the metal redispersion zone. Thus, the prior art processes that use both redispersion and drying steps are divided into two groups—one group that uses drying followed by redispersion and one group that uses redispersion followed by drying. Processes in either group perform these two steps separately and sequentially in two separate zones.

It has now been recognized that two separate steps for drying and redispersion are unnecessary and that regeneration processes that use separate steps are needlessly complex. The present invention is a moving bed catalyst regeneration process with combined drying and redispersion steps. A single reconditioning zone redisperses the noble metal and removes water from the catalyst by countercurrently contacting the catalyst with chlorine and oxygen. The single zone of this invention also promotes rechloriding the catalyst.

The present invention provides a method of reactivating a noble metal catalyst that has been deactivated by the accumulation of coke on its surface, that requires regeneration to remove coke, and that needs redispersion of the noble metal to provide adequate catalytic activity. The present invention is particularly suited for catalysts that use platinum metals and maintain a chloride concentration on the catalyst particles. For such catalyst particles, the arrangement and operation of this method and apparatus will improve the redispersion of platinum on the catalyst particles, improve the drying of the catalyst particles, and allow control of the chloride content on the reconditioned particles. The present invention can also reduce emissions and handling problems associated with gases containing hydrogen chloride. Thus, the present invention can reduce the overall expense of reconditioning such catalyst particles.

INFORMATION DISCLOSURE

U.S. Pat. No. 3,652,231 (Greenwood et al.) shows regeneration apparatus in which a constant-width movable bed of catalyst is utilized. The '231 patent also describes a continuous catalyst regeneration process which is used in conjunction with catalytic reforming of hydrocarbons. U.S. Pat. Nos. 3,647,680 (Greenwood et al.) and 3,692,496 (Greenwood et al.) also deal with regeneration of reforming catalyst. The teachings of patents ('231, '680, and '496) are hereby incorporated in full into this patent application.

U.S. Pat. Nos. 2,908,636 and 2,965,563 issued to Steffgen et al. disclose basic steps for the regeneration of reforming catalyst.

U.S. Pat. No. 3,986,982 issued to Crowson et al. teaches the completion of reforming catalyst regeneration with a final reduction step.

U.S. Pat. No. 5,087,792 issued to Cottrell et al. and U.S. Pat. No. 5,151,392 issued to Fettis et al. disclose continuous regeneration processes in which a drying step precedes a redispersion step.

U.S. Pat. Nos. 4,687,637 and 4,701,429 issued to Greenwood disclose a continuous regeneration apparatus and process in which the amount of air supplied to a combustion zone is adjusted independently of the air supplied to a drying zone.

U.S. Pat. No. 3,134,732 issued to Kearby discloses using chlorine to redisperse the metal on catalysts.

SUMMARY OF THE INVENTION

This invention is a process for regenerating hydrocarbon conversion catalyst particles and an arrangement for a regeneration zone that uses a reconditioning zone to simultaneously remove moisture from the catalyst particles and redisperse the noble metals on the catalyst particles. In the reconditioning zone, catalyst particles are countercurrently contacted with a heated gas stream containing oxygen and chlorine. Water is removed from the catalyst and the noble metals are redispersed in the presence of a high chlorine concentration. Simultaneous drying and metal redispersion reduces the cost of operating the process and building the apparatus because it combines two zones that are separate in the prior art processes. The present invention can also reduce or eliminate the discharge of hydrogen chloride to the atmosphere and the pollution problems associated therewith.

When used with regeneration processes that employ oxygen-enriched and oxygen-deficient gas streams, the advantages of the present invention can be enhanced. For example, passing an oxygen-enriched stream into the reconditioning zone, in combination with drying the catalyst in the reconditioning zone, keeps the equilibrium between hydrogen chloride and chlorine shifted toward chlorine. For a given addition rate of chloride-containing compound to the reconditioning zone, this maximizes the chlorine concentration in the reconditioning zone.

Accordingly, in one embodiment, this invention is a process for reconditioning particles that contain a noble metal in an elongated bed through which the particles move. In a first step, particles having an inlet water concentration of more than about 0.1 wt-% are introduced into an addition end of the bed. An inlet gas stream containing chlorine and oxygen is heated and passed countercurrently to the movement of the particles. This removes water from the particles and redisperses the noble metal in the particles. Particles having an outlet water concentration of less than the inlet water concentration are withdrawn from a withdrawal end of the bed. By adding catalyst particles to the addition end of the bed and withdrawing catalyst particles from the withdrawal end, the particles in the bed are moved at least periodically through the bed.

In a more detailed embodiment, this invention is a process for reconditioning platinum-containing catalyst particles. Catalyst particles are passed into a burn zone and contacted with a recycle gas comprising oxygen to combust and remove coke deposits from the catalyst particles. The catalyst particles are passed from the burn zone to a reconditioning zone. A heated inlet gas stream is introduced into the reconditioning zone countercurrently to the movement of the catalyst particles to remove water, to redisperse the platinum metal, and to increase the chloride content of the catalyst particles. The heated inlet gas stream has a temperature between about 700° and about 1100° F., a chlorine concentration between about 0.01 and about 0.5 mol-%, and an oxygen concentration between about 21 and about 39 mol-%. At least a portion of the oxygen in the inlet gas stream provides at least a portion of the oxygen in the recycle gas. The catalyst particles are passed from the reconditioning zone to a reduction zone and are contacted with a hydrogen-rich gas. The reconditioned catalyst particles are withdrawn from the reduction zone.

In another more detailed embodiment, this invention is a method for effecting regeneration of spent catalyst that is used in hydrocarbon conversion reactions and which comprises a noble metal. Spent catalyst is passed by gravity flow through a burn zone. In the burn zone, which is maintained at a temperature to oxidize the coke on the catalyst, the catalyst is contacted with a recycle gas comprising oxygen. The catalyst is passed from the burn zone by gravity flow through a reconditioning zone. A heated inlet gas stream passes through the reconditioning zone countercurrently to the movement of the catalyst to redisperse the noble metal in the catalyst, to remove water from the catalyst, and to increase the chloride content of the catalyst. The heated inlet gas stream is formed by compressing an air stream drawn from the atmosphere to an elevated pressure, passing the compressed air stream through an air drying zone that removes water from the air stream, heating the dried air stream, and mixing the heated air stream with chlorine. An exit gas stream emanates from contact with the catalyst in the reconditioning zone. A first portion of the exit gas stream is mixed with gas emanating from the burn zone catalyst to form the recycle gas, which is passed through the catalyst in the burn zone to effect combustion of coke deposits on the catalyst. A second portion of the exit gas stream is withdrawn from the process. The oxygen content of the recycle gas is measured and controlled in response to the measurement by varying the flow rate of the second portion of the exit gas stream. This varies the amount of air supplied to the burn zone from the reconditioning zone and thereby controls the oxygen content of the recycle gas.

In an apparatus embodiment, this invention is an apparatus for the regeneration of catalyst particles. The apparatus includes a vessel having an upper section and a lower section, a recycle gas inlet nozzle and a flue gas outlet nozzle that are located in the upper section, a reconditioning gas inlet nozzle and an excess gas outlet nozzle that are located in the lower section, a catalyst particle inlet nozzle is located in an upper portion of the upper section, and a catalyst particle outlet nozzle is located in a lower portion of the lower section. Inside the upper section of the vessel, there is located an inlet retention screen and an outlet retention screen that are spaced apart to define a vertically extending catalyst particle bed. The catalyst particle bed has direct communication with the catalyst particle inlet nozzle and with a lower outlet for transferring catalyst particles from the bed to the lower section of the vessel. The inlet retention screen defines, at least in part, a recycle gas distribution space that communicates with the recycle gas inlet nozzle. A gas collection space is defined in part by the outlet retention screen and communicates with the flue gas outlet nozzle. An excess gas collection space in an upper portion of the lower section is defined by a means for collecting an excess gas about the reconditioning zone. The excess gas collection space is in communication with the excess gas outlet nozzle. The lower section defines a reconditioning zone below the excess gas collection space and above the catalyst particle outlet nozzle and a means for distributing the reconditioning gas about the reconditioning zone. The means for distributing the reconditioning gas are in communication with the reconditioning gas inlet nozzle.

In another more detailed apparatus embodiment, this invention is an apparatus for the regeneration of catalyst particles. The apparatus includes a cylindrical vessel having a uniform diameter upper section, and a lower section surrounding an open center, a catalyst particle inlet nozzle and a flue gas outlet nozzle that are located at the top of the upper section, a recycle gas inlet nozzle located in the upper section, an excess gas outlet nozzle and a reconditioning gas inlet nozzle that are located in the lower section, a catalyst particle outlet nozzle is located in the bottom of the lower section, and the open center is in direct communication with the flue gas outlet nozzle at its upper end and the catalyst particle outlet nozzle at its lower end. Inside the upper section of the vessel, there are coaxially located an outer cylindrical particle screen and an inner cylindrical particle screen that are spaced apart to define an annular catalyst particle bed. The annular catalyst particle bed communicates with the catalyst particle inlet nozzle at its upper end and with the lower section at its lower end. The upper section wall of the vessel and the outer cylindrical particle screen define at least in part a recycle gas distribution space that communicates with the recycle gas inlet nozzle. Fixed about an upper portion of the wall of the lower section, there is an excess gas collector baffle having a cylindrical section coaxially located and extending downwardly in the lower section of the vessel. The excess gas collector baffle and the upper portion of the wall of the lower section define an excess gas collection volume that communicates with the excess gas outlet nozzle and has an open bottom communicating with the open center. Fixed about the lower portion of the wall of the lower section at a locus below the excess gas collector baffle, there is a reconditioning gas distributor baffle having a cylindrical section coaxially located and extending downwardly in the lower section of the vessel. The reconditioning gas distributor baffle and the lower portion of the wall of the lower section define a reconditioning gas distributing volume that communicates with the reconditioning gas inlet nozzle and the open center.

The present invention has the advantages of reducing the operating costs for catalyst regeneration and of reducing the size and complexity and thereby reducing the cost of the catalyst regeneration apparatus. First, because only one gas stream is used for both drying and redispersion, the required utilities and equipment for the present invention are less than that which would be needed to heat up two separate gas streams. Second, because the flow rate of a single gas stream into the bottom of the regeneration tower can now be less than the combined flow rate of two gas streams, the cross-sectional area of the bottom of the regeneration tower can be reduced. Third, the regeneration tower is mechanically simpler because it contains one less zone than a regeneration tower having separate redispersion and drying zones. Thus, the baffle, distributor, or nozzles of one zone are eliminated. Fourth, the overall length of the regeneration tower can now be shortened because a regeneration tower typically employs transition sections between zones, and the elimination of one zone permits the elimination of the corresponding transition section. Furthermore, the length of the regeneration tower can also be shortened because the total length of the single zone of this invention is expected to be less than the combined lengths of the two zones that it replaces. And, fifth, in a preferred form, this invention can be used to control the rate of gas flow to the zone to achieve optimum conditions for redispersion and drying while maintaining the desired concentration of oxygen to the drying zone. Other objects, embodiments and advantages of this invention are discussed in the following detailed description.

DETAILED DESCRIPTION OF THE INVENTION

Figure 1:
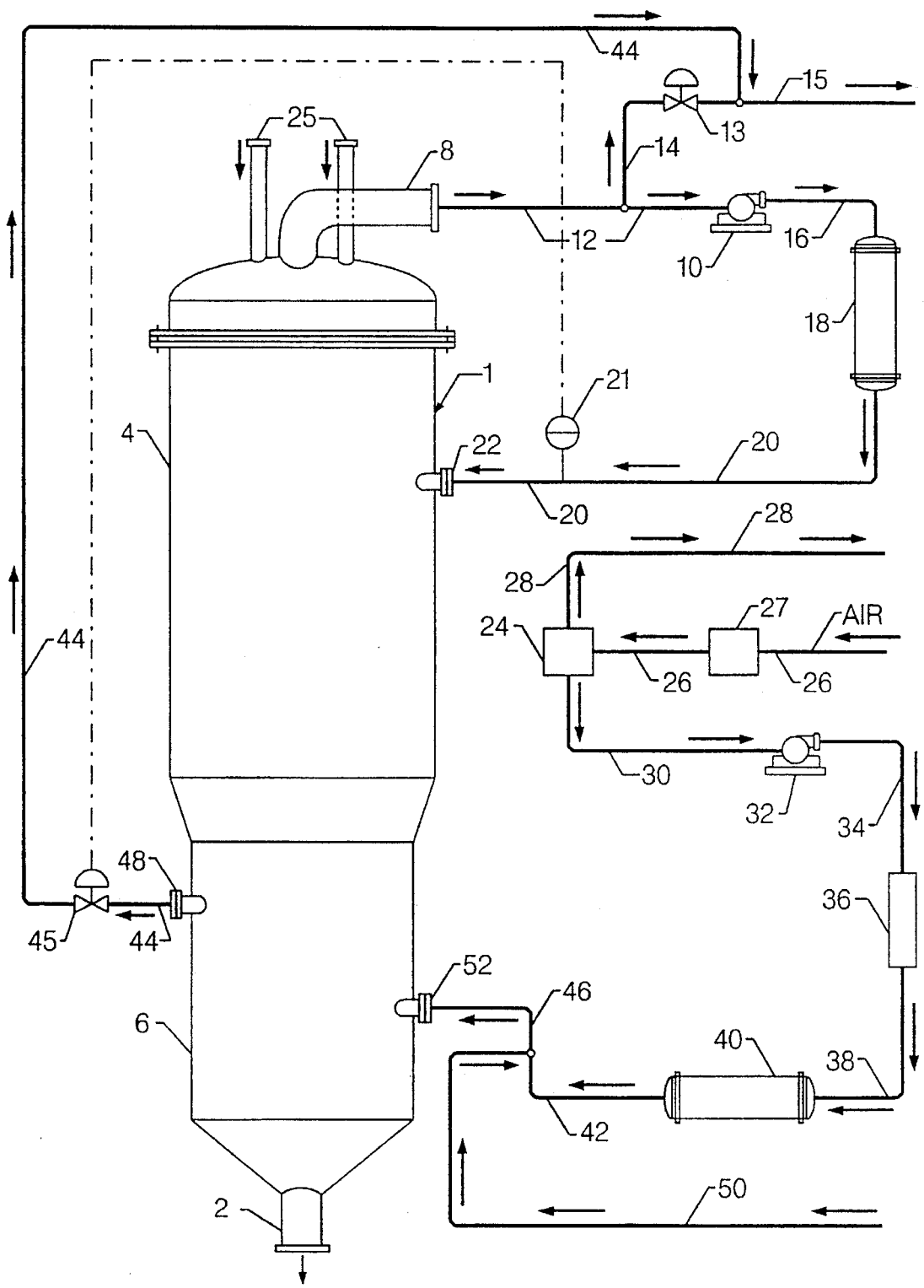
FIG. 1 is a schematic illustration of a regeneration zone arranged in accordance with this invention and some of the equipment associated therewith.

In its broadest aspects, this invention may be used to recondition any noble metal containing catalyst that loses activity by the accumulation of coke thereon and requires regeneration by the removal of coke and needs a good re-dispersion of the noble metal to provide adequate catalytic activity. This invention is particularly suited for catalysts that use platinum metals and maintain a chloride concentration on the catalyst particles. For these catalysts, the arrangement and operation of this method and apparatus will improve the redispersion of platinum on the catalyst particles, improve the drying of the catalyst particles, allow control of a chloride content on the reconditioned particles, and can reduce the overall expense of operating a regeneration zone for the reconditioning of such catalyst particles. Although all of the advantages associated with chlorided platinum alumina catalyst may not be obtained, this invention still has broad application to the regeneration of noble metal containing catalysts.

The present invention is applicable to a wide variety of hydrocarbon conversion processes including hydrogenation and dehydrogenation processes, but the most widely practiced hydrocarbon conversion process to which the present invention is applicable is catalytic reforming. Therefore the discussion of the invention contained herein will be in reference to its application to a catalytic reforming reaction system. It is not intended that such discussion limit the scope of the invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. and an end boiling point of about 400° F. The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. Nos. 4,119,526 (Peters et al.); 4,409,095 (Peters); and 4,440,626 (Winter et al.).

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chlorine. Alumina is a commonly used carrier. The preferred alumina materials are known as the gamma, eta and theta alumina with gamma and eta alumina giving the best results. An important property related to the performance of the catalyst is the surface area of the carrier. Preferably, the carrier will have a surface area of from 100 to about 500 $m^2/g$. The particles are usually spheroidal and have a diameter of from about 1/16th to about 1/8th inch (1.5–3.1 mm), though they may be as large as 1/4th inch (6.35 mm). In a particular regenerator, however, it is desirable to use catalyst particles which fall in a relatively narrow size range. A preferred catalyst particle diameter is 1/16th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In preferred form, the reformer will employ a moving bed reaction zone and regeneration zone. The present invention is applicable to a moving bed regeneration zone and a fixed bed regeneration zone. Fresh catalyst particles are fed to a reaction zone, which may be comprised of several subzones, and the particles flow through the zone by gravity. Catalyst is withdrawn from the bottom of the reaction zone and transported to a regeneration zone where a hereinafter described multi-step regeneration process is used to recondition the catalyst to restore its full reaction promoting ability. Catalyst flows by gravity through the various regeneration steps and then is withdrawn from the regeneration zone and furnished to the reaction zone. Movement of catalyst through the zones is often referred to as continuous though, in practice, it is semi-continuous. By semi-continuous movement is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed and replaced.

When using the method of this invention in a batch, continuous, or semi-continuous catalyst regeneration process, catalyst is contacted with a hot oxygen-containing gas stream (known in reforming processes as recycle gas) in order to remove coke which accumulates in the catalyst while it is in a hydrocarbon conversion reaction zone. Coke is comprised primarily of carbon but is also comprised of a relatively small quantity of hydrogen. The mechanism of coke removal is oxidation to carbon monoxide, carbon dioxide, and water. Coke content of spent catalyst may be as much as 25% of the catalyst weight, but 5–7% is a more typical amount. Within the combustion zone, coke is usually oxidized at temperatures ranging from 850°–1000° F., but temperatures in localized regions may reach 1100° F. or more. The temperature within a catalyst particle in which coke is oxidizing may be 100° F. or more higher than the bulk temperature of the gas surrounding the particle.

Oxygen for the combustion of coke enters what is called a combustion section of the regeneration zone in what has been termed a recycle gas. The recycle gas contains a low concentration of oxygen usually on the order of 0.5 to 1.5% by volume. The arrangement of a typical combustion section may be seen in U.S. Pat. No. 3,652,231. As the coke is combusted, the small amount of hydrogen within the coke reacts with the oxygen to form water. Flue gas made up of carbon monoxide, carbon dioxide, water, unreacted oxygen, chlorine, hydrochloric acid, nitrous oxides, sulfur oxides and nitrogen is collected from the combustion section and withdrawn from the regeneration zone as flue gas. Thus, the recycle gas and flue gas form a recycle gas loop wherein flue gas is continually withdrawn from the process mixed with an oxygen-containing gas to replenish consumed oxygen and returned to the combustion section as recycle gas. A small amount of the flue gas is vented off from the process to allow the addition of an oxygen-containing gas called makeup gas. The oxygen-containing gas is combined with the flue gas to replace the oxygen consumed by the coke combustion and the combined gas is recycled to the combustion section. In the past, the oxygen-containing gas was typically air. The amount of air needed in past regeneration processes to replenish the oxygen consumed during the coke combustion is relatively small, usually about 3% of the volumetric rate of the recycle gas stream.

All of the oxygen supplied to an upper region of the bed is consumed, since an abundant amount of coke is present. As catalyst particles move downward in the bed and coke is removed, a point is reached where less than all of the oxygen delivered is consumed. This is termed the breakthrough point. Typically, breakthrough occurs at a location spaced about half the distance down the total length of the bed in the combustion section. It is known to those skilled in the art that catalyst particles of the type used in the hydrocarbon conversion processes of this invention have a large surface area, which results from the existence of a multiplicity of pores. When the catalyst particles reach the breakthrough point in the bed, the coke left on the surface of the particles is deep within the pores and therefore the oxidation reaction occurs at a much slower rate.

In prior art regeneration processes it was the practice to pass the catalyst particles from the combustion section either into a redispersion zone followed by a drying zone or into a drying zone followed by a redispersion zone. This invention passes the catalyst particles from the combustion zone directly into a single reconditioning zone where the water that is left on the catalyst after the combustion process is removed and the noble metals are redispersed over the surface of the catalyst. In the reconditioning zone of this invention, the catalyst from the combustion zone is contacted countercurrently with a heated gas stream containing oxygen and chlorine. Within the reconditioning zone, redispersion and drying occur simultaneously. As the catalyst particles pass through the reconditioning zone, the catalyst countercurrently contacts a heated gas stream that progressively contains less water and more chlorine, thereby removing water from the catalyst and redispersing the noble metal.

This invention is an alternative, improved form of prior art regeneration procedures. This improved form is only possible because it has been recognized that the composition and conditions of a single zone can be adjusted so that redispersion and drying occur simultaneously. This invention merges the redispersion zone and the drying zone into one reconditioning zone. This invention has the advantages of reducing the operating costs for catalyst regeneration and of reducing the size and complexity of the catalyst regeneration apparatus.

An important requirement of the reconditioning zone of the present invention is that the heated gas stream and the catalyst flow countercurrently. The first contact of the catalyst particles entering the reconditioning zone is with the heated gas stream after it has passed through and is exiting the reconditioning zone. Exposure to reactants in a wet reduction zone and the exposure to high temperatures and steam in the combustion zone serves to agglomerate the metals on the surface of the catalyst. Thus, these entering catalyst particles, which have just exited from the combustion zone, may contain agglomerated or relatively large crystals of the noble metal, as well as residual water from the combustion process, relatively low chloride content, and residual unburned coke in the inner pores. The catalyst particles are in various states of oxidation. The size of the crystals of noble metal may be between about 20 and about 500 or more Angstroms, as measured by X-ray diffraction. The water content of the catalyst particles as measured by water adsorption isotherm may be between about 0.1 and about 0.9 wt-% water based on catalyst weight before the catalyst leaves the combustion zone, but more commonly it is between about 0.4 and about 0.6 wt-% water. The chloride content of the catalyst particles may be between about 0.05 and about 6.0 wt-% chloride and preferably for reforming catalysts between about 0.4 and 1.5 wt-% chloride based on catalyst weight before the catalyst leaves the combustion zone. The residual coke content of the catalyst particles may be between about 0.01 and about 0.5 wt-% coke based on catalyst weight before the catalyst leaves the combustion zone, but more commonly it is between about 0.05 and about 0.2 wt-%.

The reconditioning zone may operate over a wide range of operating conditions that are determined in part by the characteristics and nature of the catalyst and the desired degree of reconditioning. Generally, catalyst drying is favored at lower pressures, higher gas velocities, and longer residence times, while metal redispersion is favored at higher oxygen partial pressures. The operating conditions of the present invention may include a pressure of between about 0.5 and about 125 psig and preferably between about 0.5 and about 35 psig, a gas hourly space velocity between about 25 and about 300 $hr^{-1}$, and a particle residence time between about 2 and about 8 hr. However, it is not intended that these conditions limit the scope of the invention as set forth in the claims. Those skilled in the art will be able to determine without undue experimentation suitable pressures, space velocities and residence times to achieve the desired extent of drying and redispersion for a particular catalyst.

The heated gas stream entering the reconditioning zone may be a mixture of air and chlorine that has been heated to a temperature of between about 700° and about 1100° F. Redispersion and drying are carried out in the presence of a chlorine and an oxygen atmosphere. A high concentration of chlorine, on the order of about 0.01 to about 0.5 mol-% $Cl_2$ and preferably about 0.01 to about 0.2 mol-% $Cl_2$ of the heated gas stream is highly beneficial to promoting rapid and complete redispersion of the noble metal. A high concentration of oxygen, on the order of about 5% to about 21%, aids in the redispersion of the metallic catalyst components on the carrier. A lower water concentration in the environment in the reconditioning zone also aids in the redispersion by maintaining a high chlorine concentration. It is believed that the concentration of chlorine in the reconditioning zone is governed by the Deacon equilibrium equation:

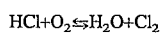

$$HCl+O_2 \leftrightarrows H_2O+Cl_2$$

Therefore, to the extent that the heated gas entering the reconditioning zone has a lower water concentration, it will favor the shift to the right of the equation, thereby maintaining more chlorine for redispersion. Since oxygen also aids in the redispersion of platinum, additional benefits are obtained by the method of this invention when an oxygen-enriched heated gas stream is passed into the reconditioning zone to increase the oxygen concentration and further promote the redispersion of the catalytic metal on the carrier. Therefore, in its preferred form, an oxygen-enriched heated gas stream will be combined with a chlorine gas and distributed in the reconditioning zone. When oxygen-enriched, the concentration of oxygen in the heated gas stream is between about 21% and about 99% $O_2$, and preferably between about 21% and about 39% $O_2$. The low water content and the high oxygen concentration will prevent a loss in chlorine concentration by preventing an equilibrium shift to the left that would produce hydrogen chloride. Especially at the inlet of the heated gas stream into the reconditioning zone, which is physically near to the catalyst outlet, the environment provides an equilibrium that favors chlorine. This is because the catalyst, after having passed through the reconditioning zone, has a low water content. Drying the gas stream before it is heated and passed into the reconditioning zone will also tend to favor chlorine and to increase the tendency of water to desorb from the catalyst. Preferably, the heated gas stream has a moisture content of less than 5 vol. ppm water. Preferably, the hydrogen chloride:chlorine molar ratio at the catalyst outlet of the reconditioning zone is 1:10.

In contrast, the environment at the catalyst inlet of the reconditioning zone provides an equilibrium that favors hydrogen chloride. This is because the entering catalyst, after having passed through the combustion zone, enters with a high water content. Also, the gas stream, after having passed through the reconditioning zone, has a relatively high water content. In the region of the reconditioning zone where this wet catalyst contacts this wet gas stream, the equilibrium reaction will favor the production of hydrogen chloride. As a result, much of the chlorine that enters the reconditioning zone will eventually be converted to hydrogen chloride once it is passed through the reconditioning zone. Such an environment at the catalyst inlet of the reconditioning zone favors the chloriding of the catalyst. The hydrogen chloride:chlorine molar ratio at the catalyst inlet of the reconditioning zone is about 10:1.

Thus, this invention results in a 100-fold change in the hydrogen chloride:chlorine molar ratio from the catalyst inlet to the catalyst outlet of the reconditioning zone. This is a consequence of the unique arrangement of the reconditioning zone of this invention. By contacting the catalyst particles countercurrently with a heated gas stream, the catalyst is dried as it passes through the reconditioning zone. Simultaneously, the hydrogen chloride:chlorine molar ratio in the environment around the catalyst decreases as the catalyst passes through the reconditioning zone, thereby creating an environment that favors redispersing the metal on the catalyst.

An alternative method to injecting all of the oxygen-enriched heated gas stream at the catalyst outlet of the reconditioning zone is injecting it in aliquot portions at multiple injection ports along the length and across the cross-section of the reconditioning zone. For example, in a vertically-aligned, cylindrical reconditioning zone, wherein the catalyst flows vertically from top to bottom and gas generally flows vertically from bottom to top, the gas may be injected not only at the catalyst outlet but also at more than one location along the axial length of the cylinder. Moreover, the gas may be injected at one or more positions across the circumferential cross-section of the cylinder. The use of multiple injection ports may aid distribution and uniform contacting of the oxygen and chlorine in the gas stream with the catalyst.

This invention uses oxygen and chlorine to redisperse the noble metal and to remove water from the catalyst. The oxygen in the heated gas stream may also assist in the final residual burning of coke from the inner pores of catalyst particles. Any excess oxygen that is not consumed in the reconditioning zone can pass upwardly with the flue gas from the combustion zone to replace the oxygen that is depleted through the combustion reaction. In a preferred form of this invention, the heated gas stream will have an oxygen concentration that is at least roughly equal to that of air. In a preferred embodiment, all or a portion of the heated gas stream will be oxygen-enriched so that there will be a high oxygen concentration in the reconditioning zone that will promote complete combustion of any residual coke left in the catalyst. Contact of the catalyst particles with a gas containing a high concentration of oxygen also aids in restoring full activity to the catalyst particles by raising the oxidation state of the platinum or other metals contained thereon.

The exiting gas stream which the catalyst particles entering the reconditioning zone contact may contain oxygen, chlorine, water, and hydrogen chloride. Compared to the heated gas stream entering the reconditioning zone, which has been described above, the gas stream exiting the reconditioning zone contains relatively less chlorine, relatively more water and hydrogen chloride, and about the same concentration of oxygen. These changes in the composition of the gas stream as it passes through the reconditioning zone result from the redispersion, drying, and rechloriding steps that occur in the reconditioning zone. This invention can also reduce emissions and handling problems associated with chlorine containing gases. The chlorine-containing gas that contacts the catalyst in the reconditioning zone comes into contact with water on the catalyst that is entering the reconditioning zone. The equilibrium reaction favors the production of hydrogen chloride. As a result, in a preferred embodiment, essentially all of the chlorine that enters the reconditioning zone will eventually be converted to hydrogen chloride as it passes through the reconditioning zone. In this preferred embodiment, the chlorine that is injected into the reconditioning zone is limited to an amount that can essentially all be taken up by contact with the particles. Thus, the concentration of total chlorine in the gas exiting the reconditioning zone can be significantly reduced. This gas exiting the reconditioning zone typically enters the combustion zone, and typically some of the chlorine that enters the combustion zone is ultimately vented from the combustion zone. Consequently, by reducing the concentration of chlorine in the gas that exits the reconditioning zone, a reduction in the emissions of chlorine and hydrogen chloride from the catalyst regeneration process results, for a savings in handling costs associated with chlorine-containing vent gases.

The catalyst particles leaving the reconditioning zone have the noble metal on the surface of the particles more dispersed and contain less water. The crystal size of the noble metal is preferably less than 20 Angstroms, which is the limit of detection of measurement of crystal size by X-ray diffraction. Before the catalyst leaves the reconditioning zone, the water content of the catalyst particles may be between about 0.01 and about 0.2 wt-% based on catalyst weight, but more commonly it is between about 0.1 and 0.2 wt-%. Generally, the leaving catalyst particles contain more chloride than the entering catalyst particles, and the chloride content of the catalyst particles leaving the reconditioning zone may be between about 0.05 and about 6.0 wt-% chloride, and preferably for reforming catalysts between about 1.0 and about 2.0 wt-% chloride, and more preferably between about 0.4 and about 1.5 wt-% chloride.

After the platinum has been redispersed on the catalyst, the catalyst when used for reforming must be reduced to change the noble metals on the catalyst to an elemental state by reduction. Consequently, in most processes, the catalyst will be contacted with a hydrogen-rich reduction gas before being used for catalytic purposes. Reduction of the highly oxidized catalyst with a relatively pure hydrogen reduction gas will restore essentially all of the catalytic activity to platinum metals that are typically used in reforming catalyst. The hydrogen-rich reduction gas may be between about 60 and about 99.9 mol-% hydrogen, but typically between about 80 and about 95 mol-% hydrogen. The hydrogen gas will contact the catalyst at a temperature generally between about 800° F. and about 1100° F., and preferably between about 900° and about 950° F. Although reduction of the oxidized catalyst is an essential step in most reforming operations, the step is usually performed just ahead or within the reaction zone and is not generally considered a part of the apparatus for the regeneration process.

Preferred embodiments of this invention use oxygen-enriched or nitrogen-enriched air streams for the catalyst treatment zones. A number of processes are known for enriching air streams with oxygen and nitrogen. These processes can use selective adsorbents, gas permeable membranes or a combination of both to generate such streams. One such process that uses a gas permeable membrane to enrich an oxygen stream and producing non-permeate stream with an increased nitrogen concentration is shown in U.S. Pat. No. 4,787,919, the teachings of which are herein incorporated by reference. This gas system has the added advantage of simultaneously reducing the moisture content of the non-permeate nitrogen stream. Additional diffusion membranes for the separation of gases are also shown in U.S. Pat. No. 3,830,733, the teachings of which are herein incorporated by reference. These and other commercially available processes can economically produce nitrogen-enriched gas streams having oxygen concentrations of 7% or less and oxygen-enriched gas streams having concentrations of 39 mol-%. Air separation processes are particularly beneficial since they provide both oxygen-enriched and nitrogen-enriched gas streams that can be used in different treatment steps of the regeneration zone. Nevertheless, this invention does not require the use of any particular source of oxygen-enriched or nitrogen-enriched gas streams for use in the conditioning steps.

Figure 2:
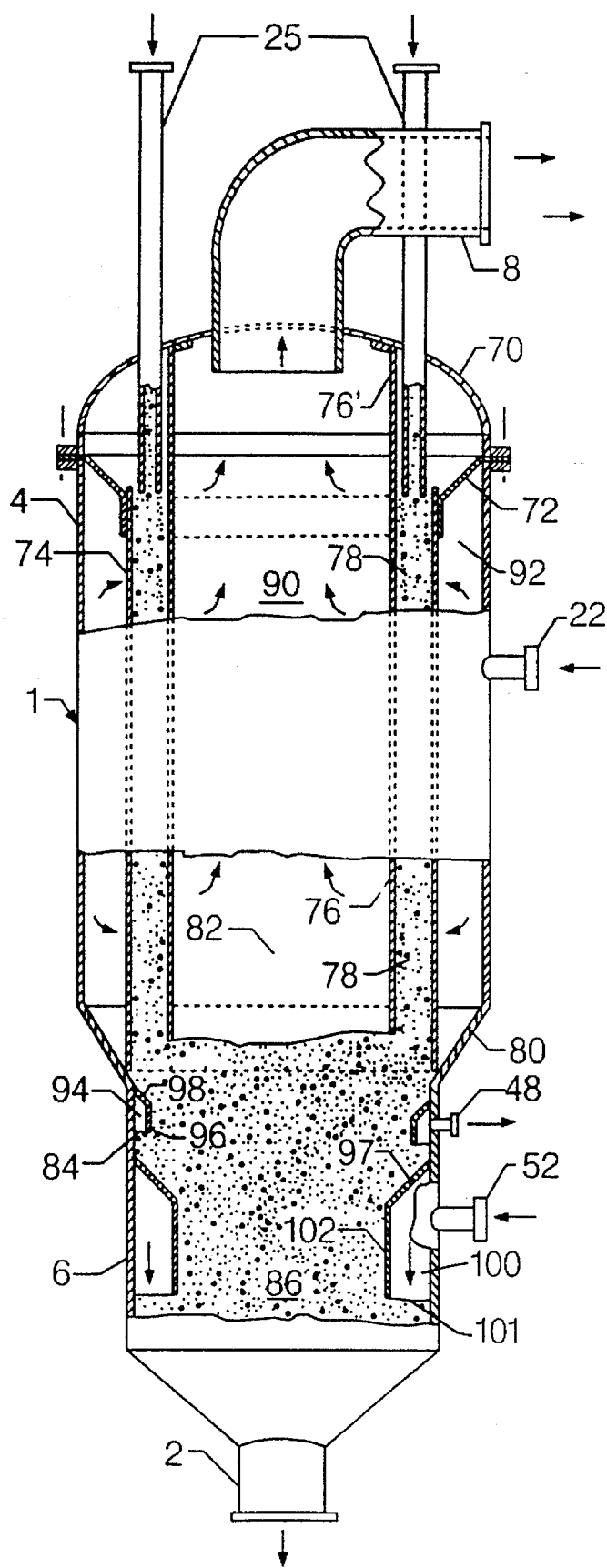
FIG. 2 is a partial cross-sectional elevation of the regeneration zone shown in FIG. 1.

The specific arrangement and operation of a regeneration process that incorporates this invention can be better understood by reference to FIGS. 1 and 2. These Figures will be used to describe an example of a particular application of this process in the reconditioning of reforming catalyst. The description of this invention in the context of a specific example and regeneration zone arrangement is not intended to limit the broad scope of the invention as presented in the claims. The drawings show only elements and equipment which are essential to a clear understanding of the invention. Application and use of additional required items is well within the purview of one skilled in the art. U.S. Pat. Nos. 3,652,231; 3,647,680; 3,692,496; and 4,701,429, which have been previously mentioned, may be consulted for additional detailed information. Numerical data provided in this example such as stream compositions, flow rates, component concentrations, temperatures and pressures have been calculated in full or in part using engineering calculation and data from related regeneration processes.

Referring now to FIG. 1, spent catalyst particles containing 5 wt-% coke are introduced into regeneration vessel 1 by means of nozzles 25. Catalyst is removed from regenerator 1 at the lower end through nozzle 2. Regeneration vessel 1 has an upper section 4 and a lower section 6. Nozzle 2 removes reconditioned catalyst from regenerator 1 and the process. The reconditioned catalyst has crystals of noble metal less than 20 Angstroms in size, a chloride content of 1.2 wt-% chloride and a water content of 0.1 wt-%.

Flue gas having an oxygen concentration of approximately 0.7 mol-% leaves the upper section of the regeneration vessel through nozzle 8. Flue gas exiting through nozzle 8 is conveyed to blower 10 by pipeline 12. Approximately 3 wt-% of the flue gas leaving the regenerator through pipeline 12 is vented from the system by pipeline 14, valve 13, and pipeline 15. The recycle gas from blower 10 is carried by line 16 and passes through heater 18. Heater 18 heats the recycle gas to carbon-burning temperatures during start-up and, if necessary, adds heat to the recycle stream during normal operation. Recycle gas leaving heater 18 through pipeline 20 passes an oxygen analyzer 21 and enters the regenerator through nozzle 22. Pipelines 12, 16 and 20 together with a hereinafter described combustion section form a recycle loop.

A gas separation system 24 supplies make-up gas to the recycle loop. Air from drier 27 contains about 5 vol. ppm water and enters gas separation system 24 by a pipeline 26. Separation system 24 produces an oxygen-deficient gas stream, carried by pipeline 28 and an oxygen-enriched gas stream carried by a pipeline 30. The oxygen-enriched gas is added to regeneration vessel 1 at a rate of addition generally equal to the rate of the gas venting from pipeline 15.

Oxygen-enriched gas from pipeline 30 is taken into blower 32. Blower 32 discharges oxygen-enriched gas into pipeline 34 and through a drier 36 that reduces the moisture content of the oxygen-enriched gas. Dry gas is passed by pipeline 38 into a heater 40 that raises the temperature of the oxygen-enriched gas to about 900° F. Dry heated oxygen-enriched gas is taken by pipeline 42 and is mixed with a chlorine stream from pipeline 50 that gives the contents of pipeline 46, a chlorine concentration of about 0.4 mol-%. The chlorine and dry heated gas enter a hereinafter described reconditioning zone through a pipeline 46 and nozzle 52. Although in this arrangement, all of the oxygen-enriched stream discharged from the heater directly enters the reconditioning zone through a single nozzle 52, other regenerator arrangements may transfer the oxygen-enriched gas from line 42 into the reconditioning zone through multiple nozzles.

A stream of gas exits regeneration tower 1 through nozzle 48 into pipeline 44. The amount of gas which is vented through nozzle 48 is controlled by a valve 45 which will be hereinafter described. The gas passes through pipeline 44, combines with the gas from pipeline 14, and exits the process through pipeline 15. The amount of gas vented by the valve 45 can be used to control the variable oxygen content of the recycle flue gas. Assuming that is desired that the recycle flue gas or combustion gas entering the nozzle 22 has a oxygen content of 0.7%, for example, the signal generated by the oxygen analyzer 21 is used to control the operation of valve 45, as indicated by the dot and dash line connection, to vent a greater or lesser amount of the gas in lower section 6 through nozzle 48. The types of controls, analyzers, and valves used are conventional and will not be described here. Venting more gas through nozzle 48 will decrease the amount left in regenerator 1 to pass into upper section 4 and will therefore cause a decrease in the oxygen content of the recycle flue gas leaving nozzle 8. Conversely, venting less gas through nozzle 48 will of course increase the oxygen content of the recycle flue gas. In a typical situation, the amount of gas required for combustion in the carbon upper section 4 might be only about 50% of that required for reconditioning in the lower section 6. The remainder of the gas would be vented. From the preceding description, it will be apparent that the flow of gas which can enter the lower section 6 through nozzle 52 can be controlled completely independently of the control means for the combustion air entering as recycle gas through nozzle 22.

The various zones and the arrangement of the internals in the regeneration vessels can be more fully appreciated from FIG. 2. Looking first at the flow of catalyst particles, nozzles 25 pass through the upper head 70 of regeneration vessel 1. The nozzles discharge catalyst particles into an annular catalyst bed 78 formed by an outer catalyst retention screen 74 and an inner catalyst particle retention screen 76. Retention screens 74 and 76, in this embodiment, are cylindrical in form and concentric with the center line of regeneration vessel 1. Retention screens 74 and 76 are perforated with holes that are large enough to allow gas to pass through the annular catalyst bed but not permit the passage of catalyst particles therethrough. Outer catalyst particle retention screen 74 extends downward from the bottom of nozzle 25 to a swedge section 80 of regeneration vessel 1. Angled supports 72 guide the top of screen 74 and keep it centered in vessel 1. Inner catalyst retention screen 76 is attached to the top head of vessel 1 and extends downward therefrom to a point slightly above the lower end of outer catalyst screen 74. The bottom 78' of the annular catalyst particle bed 78 is open to allow catalyst particles to empty from the catalyst bed into a central portion 82 of regeneration vessel 1. From about the bottom of opening 78', the catalyst particles fill the lower section 6 of the regeneration vessel 1. The volume of catalyst particles in the lower section 6 are located in a reconditioning zone that is generally denoted as 86. Catalyst particles in section 86 are statically supported by catalyst particles that extend through the end closure of lower section 6. The catalyst particles are periodically transferred by withdrawing a predetermined volume of catalyst from nozzle 2 which in turn allows all the catalyst particles to slump downward through the previous described zones.

As the catalyst particles travel downward through the regeneration process, they pass first through a combustion zone 90 that includes the previously described annular catalyst bed 78. Recycled gas that enters the combustion zone through nozzle 22 is distributed in an annular chamber 92 that extends around the outer catalyst particle retention screen and is defined on its sides by outer particle retention screen 74 and the vessel wall of upper vessel section 4 and its bottom by swedge section 80. An upper portion 76' of inner particle retention screen 76 is impervious to gas flow, or blanked off to prevent gas flow from chamber 92 across the top of the vessel. As the recycle gas passes through catalyst bed 78, oxygen is consumed in the combustion of coke and flue gas is collected in central section 82. Flue gas in central section 82 is transported out of the regeneration vessel head 70 by nozzle 8.

Catalyst below combustion zone 90 is contacted with a heated gas that enters the reconditioning zone 86 through nozzle 52 from the previously described source. A portion of the gas which reaches an upper portion of the reconditioning zone 86 exits through an annular volume 94 that collects the gas. Collection volume 94 is formed by a baffle having a vertically extended cylindrical section 96 that is concentrically located with respect to the regeneration vessel 1. The upper portion of the baffle consists of a frusto-conical section 98 that is attached to the lower section of swedge 80 and supports the upper end of cylindrical section 96. The bottom 84 of annular distributing volume 94 is open and gas flows inward into the collection volume 94 around the entire circumference of cylinder 96.

The catalyst at the bottom of the baffle 96 flows into the reconditioning zone 86 of regeneration vessel 1. Reconditioning zone 86 is formed by a baffle having a vertically extended cylindrical section 102 that is concentrically located with respect to the regeneration vessel 1. Previously described chlorine-containing drying gas enters via nozzle 52 into an annular volume 100 that distributes the gas.

Distributing volume 100 is defined by the wall of lower vessel section 6 and a baffle consisting of another concentric cylinder 102 that is secured to the lower vessel by frustoconical section 97. Again an open bottom 101 allows gas to be distributed about the entire circumference of the annular distributing volume 100 and about the reconditioning zone 86. Catalyst duration within the reconditioning zone is governed principally by the length of cylindrical section 102. In this example, the re-dispersion zone has a sufficient length to provide approximately a 4-hour residence time for the particles located therein.

Those skilled in the art will recognize that the regeneration section described by FIGS. 1 and 2 is relatively simple in comparison to those previously employed for the reconditioning reforming catalyst. The regeneration section achieves a virtually complete removal of coke from the catalyst while also obtaining re-dispersion of platinum metals and drying of the catalyst particles. This new arrangement only relies on one zone to redisperse and dry the catalyst. The previously-employed separate redispersion and drying zones found in most prior art regeneration sections have been replaced with a substantial savings in cost due to the expensive materials that were needed to withstand the high concentration of chloride compounds therein. Therefore, this invention offers a simplified arrangement for a catalyst regeneration zone that provides a superior reconditioning of the catalyst with reduced equipment cost.

What is claimed is:

1. A process of reconditioning particles containing a noble metal in an elongated bed of said particles through which said particles move, said process comprising:
   (a) introducing particles having an inlet water concentration of more than about 0.1 wt-% into an addition end of an elongated bed of said particles;
   (b) at least periodically moving said particles through said bed;
   (c) heating an inlet gas stream comprising oxygen and chlorine;
   (d) removing water from said particles and redispersing the noble metal of said particles by passing said heated inlet gas stream through said bed countercurrently to said movement of said particles; and
   (e) withdrawing particles having an outlet water concentration of less than said inlet water concentration from a withdrawal end of said bed and adding particles to said addition end of said bed thereby causing said movement of said particles through said bed.

2. The process of claim 1 wherein said particles comprise a platinum metal.

3. The process of claim 1 wherein said particles introduced into said addition end of said bed have an inlet water concentration of more than about 0.9 wt-%.

4. The process of claim 1 wherein said particles withdrawn from said withdrawal end of said bed have an outlet water concentration of less than about 0.01 wt-%.

5. The process of claim 1 further characterized in that the water concentration of said inlet gas stream is less than about 5 ppm by volume.

6. The process of claim 1 wherein the concentration of chlorine of said inlet gas stream is more than about 0.01 mol-%.

7. The process of claim 6 wherein the concentration of chlorine of said inlet gas stream is more than about 0.20 mol-%.

8. The process of claim 1 wherein said heated inlet gas stream is oxygen-enriched relative to air.

9. The process of claim 8 wherein said heated inlet gas stream comprises an oxygen-enriched gas and has an oxygen concentrate of between about 21 and about 39 mol %.

10. The process of claim 1 further characterized in that said heated inlet gas stream is at a temperature between about 700 and about 1100° F. when said heated inlet gas stream is introduced into said bed.

11. The process of claim 1 further characterized in that said bed operates at conditions including a temperature between about 700 and about 1100° F., a pressure between about 0.5 and about 35 psig, a gas hourly space velocity between about 25 and about 300 $hr^{-1}$, and a particle residence time between about 2 and about 8 hr.

12. The process of claim 1 further characterized in that an exit gas stream is withdrawn from said bed and said inlet gas stream has a concentration of chlorine that is greater than the concentration of chlorine of said exit gas stream.

13. The process of claim 1 further characterized in that an exit gas stream is withdrawn from said bed and said exit gas stream has a concentration of hydrogen chloride that is greater than the concentration of hydrogen chloride in said inlet gas stream.

14. The process of claim 1 wherein essentially all of the chloride in said heated inlet gas stream is taken up by contact with said particles.

15. The process of claim 1 further characterized in that said particles withdrawn from said withdrawal end have a chloride concentration of between 0.4 and 1.5 wt-%.

16. A process for reconditioning catalyst particles comprising platinum metal, said process comprising:
   (a) passing catalyst particles to a burn zone and contacting said catalyst particles with a recycle gas comprising oxygen to combust coke and remove coke deposits from said catalyst particles;
   (b) heating an inlet gas stream having a chlorine concentration between about 0.01 and about 0.5 mol-%, and an oxygen concentration between about 5 and about 39 mol-% to a temperature of between about 700 and about 1100° F.;
   (c) passing said catalyst particles from said burn zone to a reconditioning zone and passing said heated inlet gas stream through said reconditioning zone countercurrently to the movement of said catalyst particles to remove water from said catalyst particles, to redisperse platinum metal in said catalyst particles, and to increase the chloride content of said catalyst particles;
   (d) providing at least a portion of the oxygen in said recycle gas from the oxygen in said inlet gas stream;
   (e) passing said catalyst particles from said reconditioning zone to a reduction zone and contacting said catalyst particles with a hydrogen-rich gas; and,
   (f) recovering reconditioned catalyst particles from said reduction zone.

17. The process of claim 16 wherein essentially all of the chloride in said heated inlet gas stream is taken up by contact with said catalyst particles.

18. The process of claim 17 wherein said catalyst particles are continuously withdrawn and delivered to at least one of a dehydrogenation zone, a hydrogenation zone, and a reforming zone.

19. The process of claim 16 further characterized in that said reduction zone operates at a temperature of between about 800 and about 1100° F. and a gauge pressure of from about 5 to about 125 psig.

20. A method for effecting regeneration of spent catalyst comprising a noble metal used in hydrocarbon conversion reactions comprising:

(a) passing spent catalyst through a burn zone, by means of gravity, which is maintained at a coke-oxidizing temperature;

(b) passing said catalyst leaving said burn zone through a reconditioning zone, by means of gravity;

(c) compressing an air stream drawn from the atmosphere to an elevated pressure;

(d) passing said compressed air stream through an air drying zone wherein water is removed from said air stream, and heating said dried air stream;

(e) mixing chlorine with said dried air stream to form said heated inlet gas stream;

(f) passing said heated inlet gas stream through said reconditioning zone countercurrently to the movement of said catalyst, thereby redispersing the noble metal on said catalyst, removing water from said catalyst, and increasing the chloride content of said catalyst;

(g) withdrawing a first portion of an exit gas stream emanating from contact with said catalyst in said reconditioning zone and mixing said first portion with gas emanating from said catalyst in said burn zone to form said recycle gas;

(h) passing said recycle gas through said catalyst in said burn zone to effect combustion of coke deposits on said catalyst;

(i) withdrawing a second portion of said exit gas stream emanating from said catalyst in said reconditioning zone; and, (j) measuring the oxygen content of said recycle gas and, in response to said measurement, varying the flow rate of said second portion of said exit gas stream emanating from said reconditioning zone, thereby varying the amount of air supplied to the burn zone from said reconditioning zone by means of said reconditioning zone and controlling said oxygen content.

* * * * *